United States Patent
Nicolau et al.

(10) Patent No.: US 6,265,532 B1
(45) Date of Patent: Jul. 24, 2001

(54) METHOD FOR MAKING POLYANILINE WITH HIGH MOLECULAR MASS IN THE FORM OF EMERALDINE AND POLYNILINE OBTAINED BY SAID METHOD

(75) Inventors: Yann-Florent Nicolau, Nazaire-les-Eymes (FR); Paul Beadle, Reading (GB)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/485,266

(22) PCT Filed: Aug. 6, 1998

(86) PCT No.: PCT/FR98/01753

§ 371 Date: May 8, 2000

§ 102(e) Date: May 8, 2000

(87) PCT Pub. No.: WO99/07766

PCT Pub. Date: Feb. 2, 1999

(30) Foreign Application Priority Data

Aug. 7, 1997 (FR) .................................................. 97/10135

(51) Int. Cl.[7] .................................................. C08G 73/00
(52) U.S. Cl. .......................... 528/422; 528/486; 528/488; 528/491; 528/495; 525/540; 252/182.11; 252/500
(58) Field of Search .................................... 528/422, 486, 528/488, 491, 495; 525/540; 252/182.11, 500

(56) References Cited

U.S. PATENT DOCUMENTS 5,254,633   10/1993   Han et al. .

OTHER PUBLICATIONS

XP–002059769, Influence of chemical polymerization conditions on the properties of polyaniline, Polymer, 1989, vol. 30, Dec., pp. 2305–2311.

XP 000631129, Characterization of Solution and Solid State Properties of Undoped and Doped Polyznilines Processed from Hexafluoro–2–propanol, Macromolecules 1996, vol. 29, pp. 7838–7846.

XP 000195647, Counter–ion induced processibility of conducting polyaniline and of conducting polyblends of polyaniline in bulk polymers, 1992–Elsevier Sequoia, pp. 91–97.

WO 93/09175.
WO 92–11644.

Primary Examiner—Duc Truong
(74) Attorney, Agent, or Firm—Pearne & Gordon LLP

(57) ABSTRACT

This invention involves a process for manufacturing high molecular mass polyaniline in the form of emeraldine and polyaniline obtained by this process.

The process includes the following steps:
a) polymerising aniline or an aniline derivative to make pernigraniline by doing the polymerization in a homogeneous aqueous solution including the aniline or the aniline derivative, a protonic acid, a salt, an oxidizing agent and ethanol to yield pernigraniline,
b) reducing the pernigraniline obtained in step a) to emeraldine by means of an aqueous reducing solution which does not contain aniline, and possibly an additional step of extraction and post-polymerisation with chloroform.

The polyanilines thus protonated by (±)-10-camphor sulphonic acid are totally soluble in m-cresol and in hexafluoroisopropanol and produce flexible films with high electrical conductivity, i.e. 250–350 S/cm.

19 Claims, 6 Drawing Sheets

METHOD FOR MAKING POLYANILINE WITH HIGH MOLECULAR MASS IN THE FORM OF EMERALDINE AND POLYNILINE OBTAINED BY SAID METHOD

FIELD OF THE INVENTION

The present invention concerns a process for manufacturing high molecular mass polyaniline in the form of emeraldine.

More precisely, it concerns the manufacturing of polyaniline in the form of protonated emeraldine which is totally-soluble in several organic solvents, particularly meta-cresol, due to greater structural perfection, particularly with regard to rates of chlorination, bridging and branching of the polyaniline obtained.

STATE OF THE ART

Polyanilines can be obtained by oxidation of aniline or aniline derivatives in aqueous solution, and they are valuable because of their electronic conductivity properties and their stability in air.

Polyaniline is a polymer which can appear in different oxidation states according to the formula:

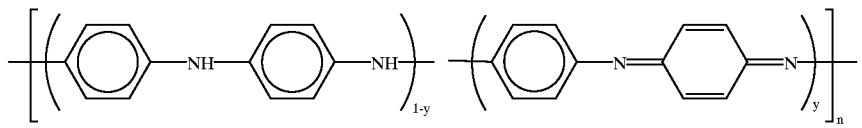

(I)

Three distinct oxidation states corresponding to $y=0$, $0.5$ and $1$ are known. The corresponding polyanilines are respectively leucoemeraldine base for $y=0$, emeraldine base for $y=0.5$ and pernigraniline for $y=1$.

Polyaniline can be protonated by a strong Bronsted acid such as hydrochloric acid (HCl) to give a protonated polymer (an ionomer salt) with the formula:

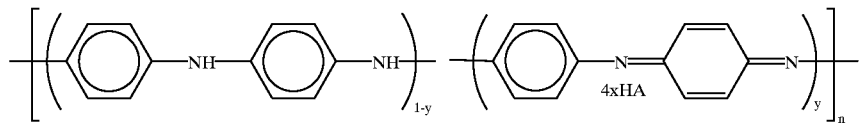

(II)

with y as defined above and x varying between 0 and ~0.75. The most conductive form is emeraldine salt with $y=0.5$ and $x=0.5$, commonly called emeraldine. It has conductivity on the order of 1 to 15 S/cm measured on compressed powder pellets.

The emeraldine base powder, though infusible, can be worked in the form of films or fibres from its soluble fraction in N-methylpyrrolidone (NMP) or di-methylpropylene urea but the films or fibres are not conductive and can only be protonated with great difficulty by very strong acids. It is more soluble in concentrated sulphuric acid, from which conductive fibres can be obtained but which have modest mechanical properties. When protonated by (±)-10-camphor sulphonic acid it is partially soluble in meta-cresol, allowing for the obtaining of films by evaporation of the meta-cresol. For most applications the electrical and mechanical properties of a polymer depend on its average molecular mass in number and in mass, $M_n$ and $M_w$, and on its polydispersion index, $P.I.=M_w/M_n$, the best properties being obtained with a high molecular mass and a reduced polydispersion index. But a high molecular mass polymer is not very valuable unless it has good solubility in its conductive form (protonated).

Document WO-A-93/09175 describes a process for manufacturing polyanilines of high molecular mass by polymerisation using an oxidising agent such as ammonium persulphate, according to which a first solution including aniline, a protonic acid and a salt is mixed with a second solution containing the protonic acid, the salt and at least one compound to start the polymerisation, such as ammonium persulphate. The reaction is carried out at a temperature below −10° C., preferably between −10° C. and about −70° C. The polymerisation reaction can be monitored by continuously measuring the redox potential of the polymerisation solution with respect to a calomel reference electrode. High molecular mass polyanilines can thus be obtained, measured by steric exclusion chromatography (SEC).

The use of this process has some drawbacks such as the monitoring of the polymerisation reaction by measurement of the redox potential at a temperature of −40° C. The measurements of molecular masses done by SEC can also give substantial errors.

The redox potential of the solution equal to the electrochemical potential of the polyaniline being synthesised is measured during the synthesis between a Pt electrode and a calomel reference electrode, both of which are immersed in the reaction bath. With the synthesis temperature of 0 to 3° C. given in example 1Ai of WO-A-93/09715, the end of the synthesis is indicated by the decrease of the potential below 430 mV, this potential corresponding to the oxidation state of emeraldine. But the potential cannot be used to monitor and indicate the end of the synthesis at −40° C., the temperature mentioned in example 1Aii in this document, because the precipitation of aniline chlorhydrate makes potential measurement impossible. This is a major drawback of the process because we cannot monitor the synthesis and control the end of this synthesis which takes place in an uncontrolled manner during the reheating of the suspension before separation of the polyaniline by filtration. The temperature at the end of the synthesis is not controlled either and therefore the syntheses cannot be reproduced.

With regard to molecular masses, the results obtained by SEC on emeraldine base in solution in NMP, even in the presence of 0.5% LiCl, are subject to substantial errors and cannot be taken into consideration quantitatively, especially for determination of high molecular masses due to the partial and colloidal solubility of emeraldine base in NMP and an aggregation equilibrium between the dissolved and aggregated macromolecules which Occurs even in a diluted solution. The best results are obtained by measuring molecular masses on polyaniline in the form of leucoemeraldine in NMP.

The $M_w$ of various polyanilines can be better compared by determination of their inherent viscosities at 25° C. in concentrated sulphuric acid because most polyanilines are totally soluble in this acid without degradation. This measurement indicates a $M_w$ which results from an average rotation radius of the macromolecules however. This radius depends on $M_w$ for a given chain structure. But different synthesis conditions produce chains containing several types of flaws of different rates, among which the most serious are: branching and bridging of chains and chlorination of chains. The comparison of $M_w$ of various emeraldine bases can only be done by comparison of their inherent viscosities if their chains have the same rates of branching and chlorination. The rate of chlorination is sometimes indicated because it can be determined by elementary analysis, but not the rate of branching and bridging because it cannot be quantitatively determined. It is evaluated with the $M_w$ by the solubility of the emeraldine base in NMP or in dimethyl-propylene urea and of the emeraldine protonated by CSA in meta-cresol and by the speed of gelling of these solutions. Document WO93/09715 gives no indication, neither of the rate of chlorination, nor of the solubility of the polyaniline obtained.

A synthesis of polyaniline done according to the synthesis conditions described in example 1Aii of WO-A-93/09175 at −40° C., in the presence of 5.8M of LiCl, yielded an emeraldine base containing a fraction by weight of insoluble polymer protonated by CSA in meta-cresol of ~15% and a rate of chlorination of ~3%.

This synthesis process therefore cannot produce a high molecular mass polyaniline with a negligible rate of chlorination and a low rate of branching and bridging capable of making the emeraldine protonated by CSA totally soluble in meta-cresol or hexafluoroisopropanol to yield self-supported films with high conductivity.

SUMMARY OF THE INVENTION

This invention precisely involves a process for manufacturing polyanilines which overcomes the drawbacks of the process described above, which gives, in a short time and in a reproducible manner, a high molecular mass polymer with a negligible rate of chlorination and a low rate of branching and bridging, totally soluble in meta-cresol or hexafluoroisopropanol in the form of emeraldine protonated by CSA, this process being in addition suitable for use on an industrial scale According to the invention, the process for manufacturing a high molecular mass polyaniline in the form of emeraldine includes the following steps:

a) polymerising aniline or an aniline derivative in pernigraniline, doing the polymerisation in a homogeneous aqueous solution including the aniline or the aniline derivative, a protonic acid, a salt, an oxidising agent and ethanol to yield pernigraniline, b) reducing the pernigraniline obtained in step a) to emeraldine by means of an aqueous reducing solution which does not contain aniline.

This process differs notably from the process described in WO-A-93/09175 by the fact that polymerisation of aniline is done at the pernigraniline stage, which corresponds to formula (I) given above with y=1, and that the reduction of this pernigraniline to emeraldine is then done using an aqueous reducing solution which does not include aniline.

In the process of the prior art, this reduction step occurs by means of the excess aniline rather that with a suitably chosen reducing agent.

According to the invention, the aniline derivative which can be used in step a) can be an aniline substituted either on the $NH_2$ group, or on the benzene core, or on both, by one or several groups such as alkyl, alcoxy, alkylcarboxyl or alkyl sulphonic groups.

For example, such derivatives could be N-methylaniline, o-toluidine, o-butylaniline, o-methoxyaniline and N-(4-butyl-1-sulphonic)aniline, etc.

For the polymerisation, the protonic acid used can be chosen from among several strong protonic acids which are resistant to oxidation. Acids such as HCl, $H_2SO_4$ or $HClO_4$ could be used for example. Hydrochloric acid (HCl) is preferably used.

The salts used for polymerisation are preferably salts of the same anion as the acid used. Chlorides, sulphates, acetates, and nitrates of metals such as alkaline metals and ammonium can be used. Lithium chloride is preferably used.

The oxidising agents to be used for polymerisation can be chosen from oxidants which can oxidise aniline such as ammonium persulphate, $K_2Cr_2O$—, $KIO_3$, KMnO4, and $H_2O_2+FeCl_3$. Ammonium persulphate $(NH_4)_2 S_2O_8$ is preferably used.

This polymerisation step is preferably done at a temperature in the range from −45° C. to −5° C.

This step is preferably done by adding a solution of the oxidising agent and the salt in the protonic acid to an aqueous solution of aniline or an aniline derivative containing the protonic acid, the salt and ethanol.

The concentrations of the components of the two solutions and their proportions in the mixture are preferably such that the aqueous polymerisation solution includes:

0.25 to 0.5 mol/l of aniline or an aniline derivative (An), 0.5 to 2 mol/l of hydrochloric acid, 2 to 3 mol/l of lithium chloride, 30 to 40% ethanol by volume, and a quantity of ammonium persulphate such that the molar ratio of ammonium persulphate (APS) to aniline or to the aniline derivative (APS/An) is from 0.2 to 1.5.

The polymerisation reaction is controlled by determining the redox potential of the aqueous solution in which the polymerisation is done in order to stop this polymerisation reaction by addition of the reducing solution when the redox potential begins to decrease after having reached a maximum value. This maximum value may be in the range of 780 to 820 mV with respect to a calomel reference electrode.

The reduction step b) can be done with various reducing solutions.

The reducing solution is preferably an aqueous solution of ferrous chloride including the protonic acid and the salt used in step a).

In particular, it could be a solution of $FeCl_2$ in a concentration of between 2.5 and 3 M containing LiCl in a concentration of 2 to 2.5 M in HCl in a concentration of 1.5 to 2.5 M, containing double the quantity needed to reduce the polyaniline to the emeraldine state. The reducing solution could also be an aqueous solution of copper chloride CuCl or tin chloride $SnCl_2$ including the protonic acid and the salt used in step a), the concentration of CuCl or $SnCl_2$ in the aforementioned solution being from 1 to 2 mol/l.

After the reduction step, the invention process preferably includes an additional step c) involving submitting the emeraldine separated from the reaction medium of step b) to extraction and post-polymerisation with chloroform.

The emeraldine separated from the reaction medium of step b) is generally first subjected to deprotonation before step c).

Step c), the extraction with chloroform, increases the molecular mass of the polyaniline by elimination of oligomers of low molecular mass and by an additional post-polymerisation phenomenon.

After the chloroform extraction step, there is advantageously an additional step of deprotonation of the processed emeraldine.

The invention process is particularly advantageous because it yields polyaniline in the form of high molecular mass emeraldine which is totally soluble in meta-cresol after protonation by CSA. The solutions obtained can be used to prepare, by meta-cresol evaporation, self-supported polyaniline films with high electrical conductivity, for example from 250 to 350 S/cm.

The invention also involves polyanilines in the form of emeraldine base obtained by the invention process which have an inherent viscosity $\bullet_{inh}$, at 25° C. in a 0.1% solution of concentrated sulphuric acid, of 1.8 to 2.2 dl/g.

Other characteristics and advantages of the invention will be clearer with a reading of following description which is simply illustrative and in no way limiting with reference to the drawings in appendix.

BRIEF DESCRIPTION OF THE DRAWINGS

(FIG. 5) and at −7° C. (FIG. 6) protonated by CSA in solution in metacresol.

DETAILED DESCRIPTION OF EMBODIMENTS

Described below is an embodiment of the invention process in which the polymerisation of aniline is done with a protonic acid (HCl), a salt (LiCl) and ammonium persulphate as an oxidising agent. The polymerisation step is described first.

a) Polymerisation Step

This step can be done with a double-wall reactor cooled by circulation of a refrigerating liquid with a thermostat to cool the reactor to −45° C., ensuring good thermal transfer.

A first aqueous solution of aniline chlorhydrate from aniline purified by vacuum distillation, or recrystallised aniline chlorhydrate in HCl in the presence of LiCl and ethanol is put in the reactor and this solution is cooled in the reactor with stirring at the synthesis temperature.

A Pt electrode, a reference electrode of calomel or g/AgCl and a temperature probe (for example Pt resistance of 100 •) are placed into this solution by means of an electrolyte bridge which does not crystallise and does not freeze at the synthesis temperature (for example a bridge containing an LiCl solution in ethanol). The electrodes and the probe are advantageously linked to a digital pHmeter-mVmeter controlled by a computer which records the redox potential of the solution and its temperature point by point during the synthesis.

A second solution containing ammonium persulphate (APS) in HCl in the presence of LiCl is prepared and cooled to the synthesis temperature.

The polymerisation begins by pouring the second APS solution all at once into the reactor containing the first aniline chlorhydrate solution and then the redox potential of the solution and the temperature are recorded every 15, 30 or 60 seconds. The progress of the synthesis is followed by monitoring the changes in potential and temperature as a function of time.

Figure 1:
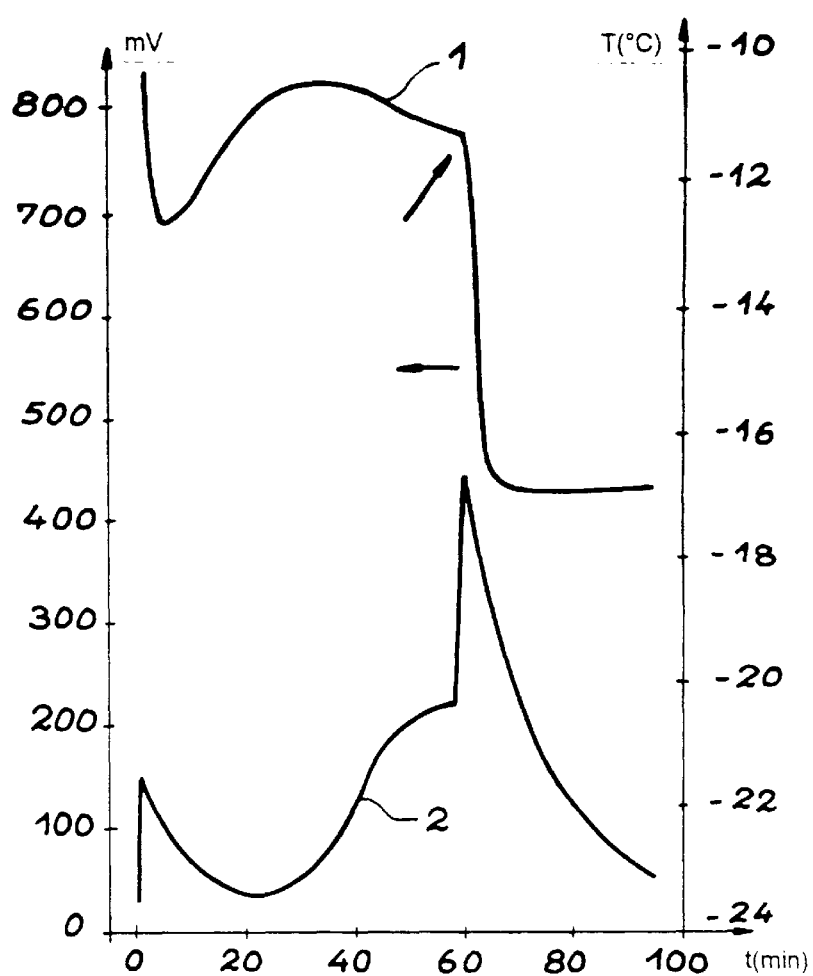
FIG. 1 is a graph showing the change in potential (in mVolt) as a function of time (in minutes) during production of polyaniline (curve 1) and the change in temperature in (° C.) as a function of time (in minutes) during this production (curve 2), in the case of example 1.

Curve 1 of FIG. 1 shows the change in potential (in mV) as a function of time (min), and curve 2 illustrates the change in temperature (in ° C.) as a function of time (in min).

FIG. 1 shows that as soon as the oxidant is added there is an immediate rise in the redox potential, then the potential decreases and reaches a minimum, then it rises again and remains practically constant, forming a plateau at 800–820 mV. As soon as the oxidant is added, the temperature decreases while the potential decreases and then it rises again. The temperature rises as soon as the potential arrives at the plateau and continues to rise while the potential remains stable.

During this time, the APS oxidises the aniline which polymerises by a radical-anionic mechanism to form polyaniline in the oxidation state corresponding to pernigraniline according to the overall polymerisation reaction:

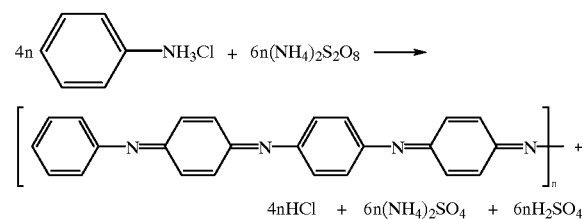

When the potential begins to decrease, which corresponds to a point of maximum temperature, all of the APS has been reduced and the polymerisation step is over.

An aniline solution and APS solution are generally prepared so that after mixing them the aniline concentration is 0.20 to 0.5M, the HCl concentration 0.5 to 2M, the LiCl concentration 2 to 3M, the APS/aniline molar ratio is 0.2 to 1.5 and the ethanol concentration is 30 to 40% by volume. LiCl is dissolved in both the aniline solution and the APS solution. The molar ratio between the quantity of LiCl dissolved in the aniline solution and the quantity of LiCl dissolved in the APS solution will be chosen between 1.5 and 2.5, the volume ratio of the aniline solution and the APS solution will be chosen between 2 and 3, but ethanol is not added to the APS solution. These concentrations and ratios were determined experimentally to yield high molecular mass polymers, to avoid chlorination while maintaining rapid kinetics and to give a good yield. There is no crystallisation in the aniline solution, the APS solution or their mixture at the synthesis temperature thus ensuring rapid kinetics leading to formation of high molecular mass chains.

The exothermic polymerisation reaction is indeed rapid because despite the cooling the temperature rises by 5 to 9° C.

Instead of a double-wall reactor cooled by circulation of a refrigerating liquid, a simple reactor placed in a Dewar flask may be used and cooled by crystals of o-oxylene, nitromethane or tetrachloroethane at their corresponding melting points, which gives respectively synthesis temperatures of −25, −29 and −43° C. The redox potential and the temperature can also be recorded in another way, for example by using digital printers or plotters.

At the beginning of the polymerisation following the addition of the APS solution to the aniline solution, the APS oxidises the deprotonated aniline to form a cation radical which then dimerises. The potential thus decreases from 800–830 mV to about 680 mV and the temperature decreases by 1–3° C. during the first 15–20 minutes, because the deprotonation of aniline chlorhydrate and the oxidation of aniline are endothermic reactions.

The polymerisation then continues in a chain by addition of radical cations to the diner, trimer, oligomer and polymer radical cations which are growing. The potential rises and remains at a plateau of 800–820 mV during the polymerisation until the APS is consumed and the temperature rises to reach a maximum.

Precipitation of pernigraniline occurs as soon as the chains form but it becomes visible after about 20 minutes, corresponding to the potential's arriving at the plateau. The polymerisation is rapid and there is no systematic stopping reaction which limits the size of the polymer. The chain stops growing either due to a lack of oxidised monomers or due to inactivation of its extremities due to precipitation of the polymer. Any synthesis parameter which accelerates polymerisation and slows down the germination of chains increases the molecular mass of the polymer. Low temperatures (−45° to −50° C.), the addition of LiCl and dilution all favour this.

The use of low temperatures reduces the speed of polymerisation but more greatly reduces the speed of oxidation of aniline and the speed of hydrolysis of pernigraniline (breaking of chains with blocking of reactive positions by formation of quinone, >CO and nitroso, >NO groups), leading to higher molecular masses.

Figure 2:
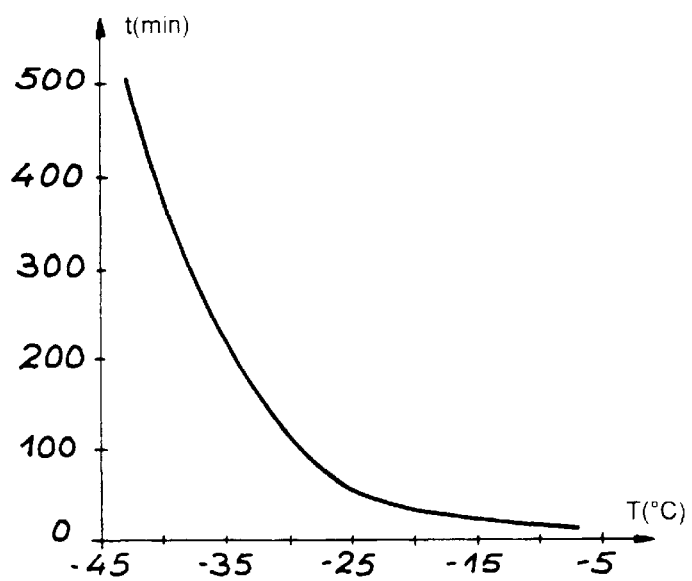
FIG. 2 is a graph illustrating the duration (in minutes) of the polymerisation step as a function of the temperature used for this step (in ° C.).

In FIG. 2 which shows the duration of polymerisation as a function of the temperature used for this polymerisation, the polymerisation time increases substantially when the synthesis temperature decreases from −30° C. to −45° C. or more; the synthesis temperature is therefore advantageously chosen between −25° C. and −30° C.

Figure 3:
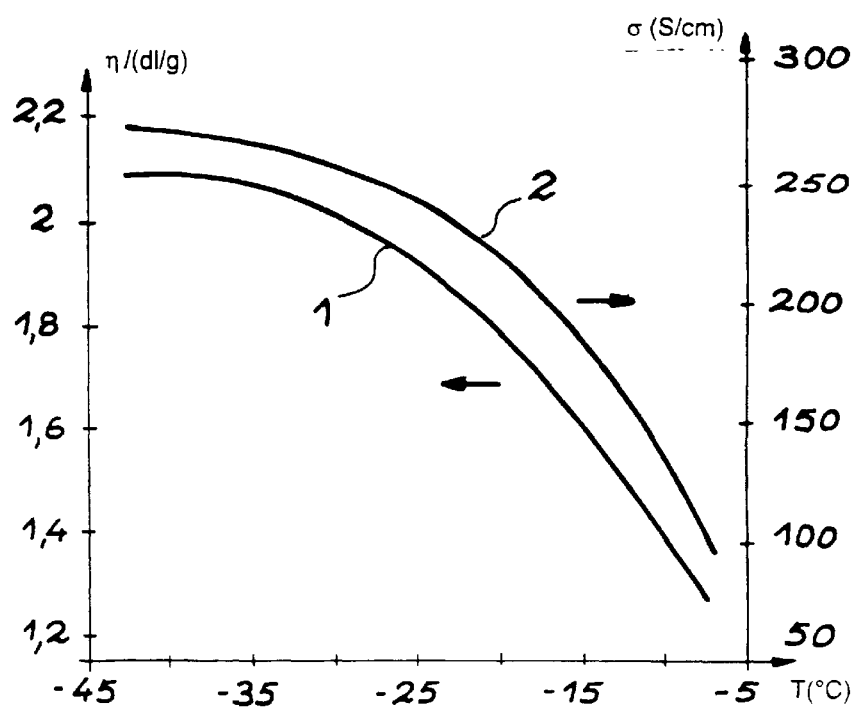
FIG. 3 is a graph illustrating the change in viscosity $\bullet_{inh}$ in dl/g as a function of the manufacturing temperature in ° C. (curve 1), and the change in conductivity • in S/cm as a function of this temperature in ° C. (curve 2).

In FIG. 3, curve 1, which shows the change in inherent viscosity $\bullet_{inh}$ (in dl/g) as a function of polymerisation temperature, the viscosity decreases when the temperature increases. Higher molecular masses are thus obtained at lower temperatures.

The LiCl agent increases the ionic force of the solution which increases the polymerisation speed and decreases the speed of germination of chains and consequently increases the molecular mass of the chains. The effect is substantial up to a concentration of ~2M. Beyond a concentration of 3.4M, the molecular mass no longer increases and when the concentration is raised to 5.2M, the molecular mass on the contrary decreases because the viscosity of the solution becomes too great. In addition, the increased LiCl concentration helps in chain chlorination.

The aniline concentration can be increased to more than 0.5M but to the detriment of the molecular mass. It can also be decreased to less than 0.25M but to the detriment of productivity.

The addition of 30 to 40% ethanol by volume does not decrease the molecular mass due to the decrease of the ionic force of the solution because the effect is apparently counterbalanced by the decrease in viscosity of the solution and by the introduction of an unexpected delay in the polymer precipitation.

The yield with respect to APS is 95–100%. The yield with respect to aniline depends on the APS/An molar ratio. It is close to 90–95% for APS/An molar ratios of 1.2–1.5 but when this ratio is increased, the molecular mass decreases because this favours hydrolysis of the chain and it also becomes difficult to determine the end of the polymerisation to do the reduction. It is preferable to choose APS/An molar ratios $\bullet$ 1. These yields were determined on crude synthesised emeraldine base including the following steps of reduction and deprotonation of the emeraldine. But they are determined by the polymerisation step because the reduction and deprotonation are practically quantitative. The yield with respect to the aniline decreases with the decrease in the APS/An molar ratio because there is excess aniline which was not oxidised and which is not involved in the polymerisation. This excess can be recovered from the filtrate. The yield of polymer is also 95–100% with respect to the oxidised aniline because only a few percent of oligomers are formed.

b) The Reduction Step

In order to obtain polyaniline in the form of emeraldine, the pernigraniline obtained in step a) is reduced by adding all at once a reducing solution at the moment when the redox potential of the medium starts to decrease, which coincides with the maximum temperature of the polymerisation medium. The reducing solution is first cooled to the temperature of the end of the polymerisation. Among reducing agents, ferrous chloride ($FeCl_2$), copper chloride (CuCl) or stannous chloride ($SnCl_2$) in HCl solution are advantageously chosen. Concentrated solutions which do not crystallise at the synthesis temperature are preferably chosen. LiCl is added to the solution to prevent crystallisation.

When $FeCl_2$ is used, the reduction of pernigraniline (PNA) to emeraldine occurs according to the overall reaction:

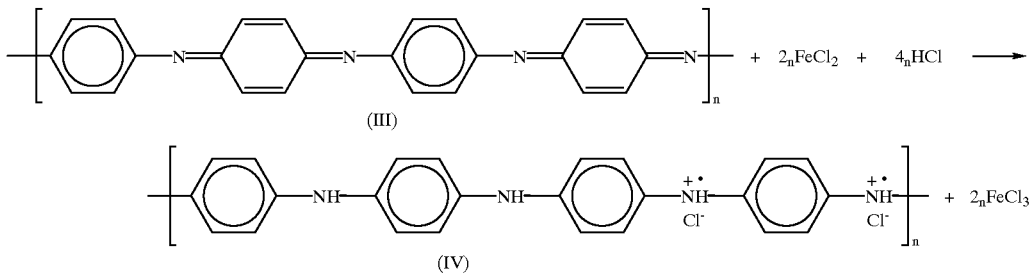

The concentration of $FeCl_2$ is preferably from 2.5 to 3.5 mol/l in the presence of 2 to 2.5 mol/l of LiCl in 1.5 to 2.5 mol/l of HCl. Two times the quantity of $FeCl_2$ needed to reduce the PNA to emeraldine is generally used. The reduction is thus total and immediate and the final potential will correspond to the redox potential of the $Fe^{2+}/Fe^{3+}$ system with a ratio of concentrations $[Fe^{2+}]/[Fe^{3+}]=1$, on the order of 430–450 mV vs. ESC at 25C to the concentration of HCl used, which corresponds to the oxidation state of emeraldine.

If CuCl or $SnCl_2$ is used as a reducing agent, stoichiometric quantities must be taken to avoid reducing the pernigraniline beyond its oxidation state corresponding to emeraldine. The decrease in redox potential, which should not decrease beyond 360–380 mV at the synthesis temperature, can be monitored. The concentration of the CuCl or $SnCl_2$ solutions will be chosen between 1 and 2M, in the presence of 2 to 2.5M LiCl in HCl 1.5–2.5M.

As can be seen in FIG. 1, curve 1, the redox potential at the end of polymerisation starts to decrease from ~800 mV; at the moment when the reducing solution is added it falls sharply to 360–380 mV, indicating total reduction of the pernigraniline to emeraldine. The reduction reaction is also exothermic and rapid; the bath temperature rises quickly by 3–4° C., but this has no effect on the quality of the polymer. The temperature then goes back down slowly to the reference temperature (synthesis temperature) depending on the reactor's heat transfer capacity but this is not imperative. The cooling and filtering of the polyaniline suspension can be stopped or the solution can be left to heat up to room temperature and then filtered on a filter with porosity of ~10 •m allowing for filtering of acid solutions. The precipitate is abundantly washed with a 0.5–1M HCl solution and it is then dried in an vacuum oven at a temperature of 40–50° C. for 12 to 24 hours. This yields crude synthesised emeraldine in the form of a green-black power protonated by HCl.

This step of reduction of pernigraniline to emeraldine is very important in the invention because it allows for controlling the rate of bridging and branching of the polyaniline obtained.

In the synthesis of the prior art, the pernigraniline formed is reduced by the excess aniline with formation of a number q of oligomers of rank p following the oxidation of aniline by PNA to form cation radicals according to the reaction:

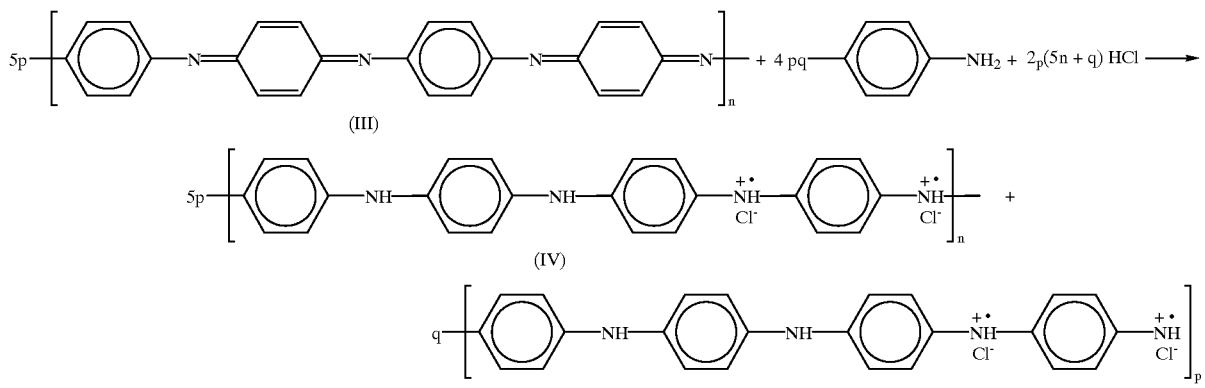

The oligomers have a degree of polymerisation DP•2, not just a multiple of 4 as the reaction indicates to simplify the formulation. But in parallel with the formation of oligomers, the aniline molecules reduce the PNA with a greater probability of addition to the chains by an auto-catalytic mechanism which leads to branching and bridging with two possibilities:

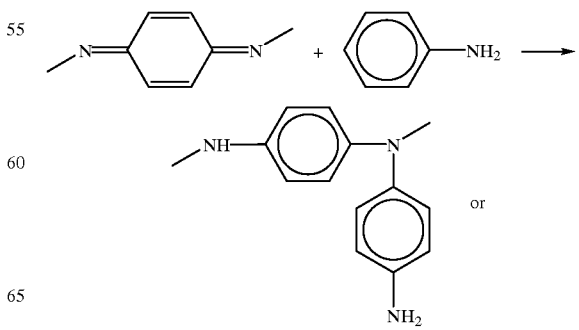

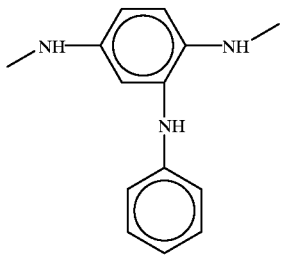

along with chain lengthening:

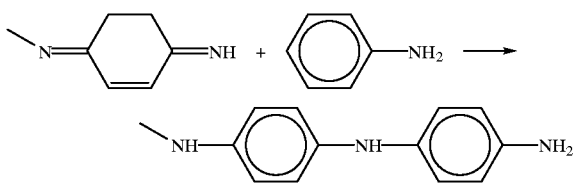

This auto-catalytic polymerisation mechanism is also active during the polymerisation step alongside the radical mechanism. During this step however, as long as there is still APS, the radical chain polymerisation is considerably more rapid than the auto-catalytic polymerisation.

The invention process is specially designed to avoid as much as possible auto-catalytic polymerisation which generates flaws in arrangement and oligomers.

Instead of $FeCl_2$, CuCl or $SnCl_2$, other reducing agents such as sodium sulphite, metabisulphite, hydrosulphite, hypophosphite or hypophosphoric acid can be used in the reducing solution, but as these reducing agents are nucleophilic, they risk sulphonating or phosphonating the polyaniline and they should thus only be used if an auto-protonated polyaniline is desired.

To obtain polyaniline in the form of emeraldine base, the crude synthesised emeraldine power obtained at the end of step b) is deprotonated by putting it in suspension, with stirring, in a 0.1–0.3M ammonium hydroxide solution for 48 to 72 hours. The emeraldine base suspension is filtered on a filter with porosity of ~10 •m, washed abundantly with demineralised water and dried in a vacuum at room temperature for 12 to 24 hours. Crude synthesised emeraldine base in the form of a marine blue-black power is thus obtained.

This crude emeraldine base then undergoes extraction with chloroform p.a. (99.9% stabilised with 0.5–1% ethanol) for 6 to 12 hours in a Soxhlet extractor, the time needed to siphon colourless chloroform. The emeraldine base is then dried, first air-dried, then in a vacuum, at room temperature. The deprotonation operation is then repeated with an ammonium hydroxide solution in the same conditions as before to yield emeraldine base in its final form.

Extraction with chloroform removes 0.3–0.7% of the oligomers and other secondary products with Mp ~3000 g/mol. It was found that extraction with chloroform increased the molecular mass of emeraldine base by 5 to 50%, much more than the elimination of low molecular mass chains would justify. During the extraction there is an unexpected post-polymerisation which was unknown until now. But the extraction does not make the emeraldine base partially insoluble in NMP or in concentrated sulphuric acid as could be the case with extractions using acetonitrile and especially tetrahydrofuran.

The emeraldine films extracted, deprotonated and reprotonated by CSA, obtained by evaporation of meta-cresol from a solution in meta-cresol show conductivity superior to that of films obtained from crude synthesised emeraldine by a factor of as much as 50%.

Polymer characterisation and quality control

The following are measured to characterise the polyaniline obtained:
the molecular mass of the emeraldine base directly by steric exclusion chromatography (SEC) and indirectly by measurement of the inherent viscosity;
conductivity of the emeraldine film protonated by CSA, obtained by evaporation of meta-cresol;
and the following are recorded:
the UV vis. absorption spectrum of emeraldine base in NMP containing 0.5% LiCl; and
the UV vis. near IR absorption spectrum of the solution of emeraldine protonated by CSA in the meta-cresol which was used to obtain the film.

The inherent viscosity of the 0.1% emeraldine base solutions in 97% sulphuric acid is determined at 25° C. using a Ubbelohde capillary viscosimeter with a capillary diameter of 0.3–0.5 mm.

Curve 1 of FIG. 3 illustrates the change in inherent viscosity $•_{inh}$ (dl/g) of the emeraldine base as a function of the synthesis temperature (in ° C.).

The inherent viscosity of the emeraldine base solutions increases when the synthesis temperature decreases. For samples synthesised between –25° C. and –30° C., it is between 1.8 and 2.2 dl/g.

By way of comparison with other determinations of molecular mass done by SEC, the molecular mass of emeraldine base samples was obtained according to the invention by SEC using a PLgel 10 •m mixed-B column from Polymer Labs maintained at 80° C., calibrated with standard polystyrene polymers and with a refractometer as a detector, on 0.05% emeraldine base solutions in NMP containing 0.5% LiCl, which were first filtered on a 0.2 •m porosity filter with a flow speed of 0.5 ml/minute. The $M_w$ determined by SEC on emeraldine base solutions synthesised at low temperatures according to our manufacturing process reaches an upper limit around 150,000–170,000 g/mol, with a PI between 2 and 3. This is due to the fact that the values obtained are under-estimated because the high molecular mass emeraldine base chains form colloidal clusters in the NMP solution even in the presence of LiCl. The cluster remains on the filter before injection of the solution into the column. It is consequently impossible to compare the molecular masses of the samples in the emeraldine base state. For a synthesis temperature of –30° C., an M; closer to the reality of ~200,000 g/mol was determined by injecting into the column the emeraldine base solution reduced to leucoemeraldine base by phenylhydrazine.

The molecular mass and the perfection of the chains in terms of stoichiometry in conjugation length can be compared, i.e. considering the effective ratio between the quinone and benzene nuclei by comparing the UV vis. absorption spectra of 0.05% emeraldine base solutions in NMP containing 0.5% LiCl. These spectra have a UV absorption peak at 330–332 nm, corresponding to a excitonic transition of benzene nuclei and another around 660–680 nm, corresponding to an excitonic transition of the quinone nuclei forming the quinonediimine groups. In the same redox state (i.e. at the same end of synthesis potential which is almost always observed, the potential corresponding to the oxidation state of emeraldine) there should be the same ratio between the intensity of the peak at 660–680 nm and the intensity of the peak at 330–332 nm, $I_{ex}/I_{...*}$=approx. constant, corresponding to the stoichiometry Q/B=⅓, where Q represents quinone nuclei and B benzene nuclei. In the same redox state the wavelength of a quinonediimine peak depends on the length of conjugation (average statistical length between two flaws) which determines the planar nature of the chains; it increases with their growth.

Comparison of sample spectra from various syntheses shows differences concerning both the wavelength of the quinonediimine peak and the ratio of the peak intensities. There are wavelengths with excitonic peaks between ~660 and 680 nm and ratios of intensities between ~0.8 and 1.06. Greater peak intensities correspond to greater wavelengths, thus indicating a lesser difference in stoichiometry for samples with greater conjugation lengths and more planar chains.

The conductivity of 25 •m-thick self-supported emeraldine films protonated by CSA is measured by the van der Pauw method. The films were obtained by evaporation of meta-cresol in air at 50° C. over three days on a polypropylene support from a 0.5% emeraldine base solution in meta-cresol. The emeraldine base was protonated by CSA at a rate of $1H^+/2N$ in solution in meta-cresol with stirring for one month. The films were detached from their substrates by immersion in a 1M CSA solution, rinsed with acetonitrile and dried before measurement. The conductivity of the films produced by syntheses according to the invention varies from 100 to ~350 S/cm, as can be seen from curve 2 of FIG. 3. The conductivity increases with the lowering of the synthesis temperature as the inherent viscosity of solutions in sulphuric acid made from the same samples of emeraldine which were used to make the films.

Figure 4:
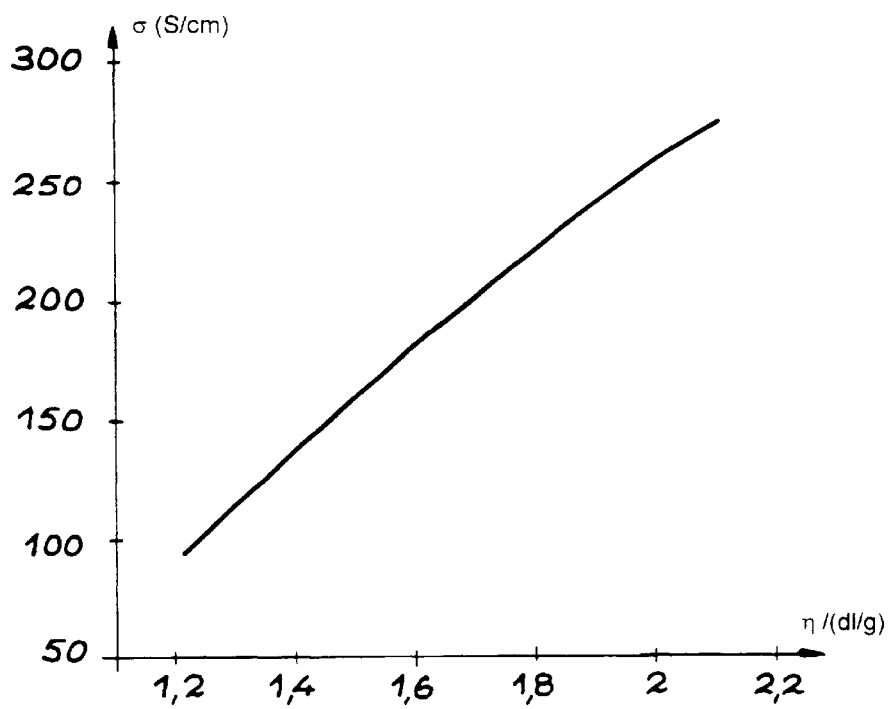
FIG. 4 is a graph illustrating the variations in conductivity (S/cm) as a function of the inherent viscosity ($\bullet_{inh}$ in dl/g).

FIG. 4 shows the correlation between conductivity and inherent viscosity and thus molecular mass. From this figure it is clear that conductivity increases with molecular mass.

The conductivity and inherent viscosity values which were used to establish FIGS. 3 and 4 show average values obtained at temperatures ranging from –7 to –43° C.

The UV, vis., near IR absorption spectra were recorded on a Varian Carry 2400 spectrophotometer from a drop of the solution used to make the films; spread by capillary adhesion between two plates of infrasil quartz. The UW vis. near IR absorption spectra of the emeraldine protonated by CSA in meta-cresol depend on the molecular mass and the quality of the emeraldine base.

Figure 5:
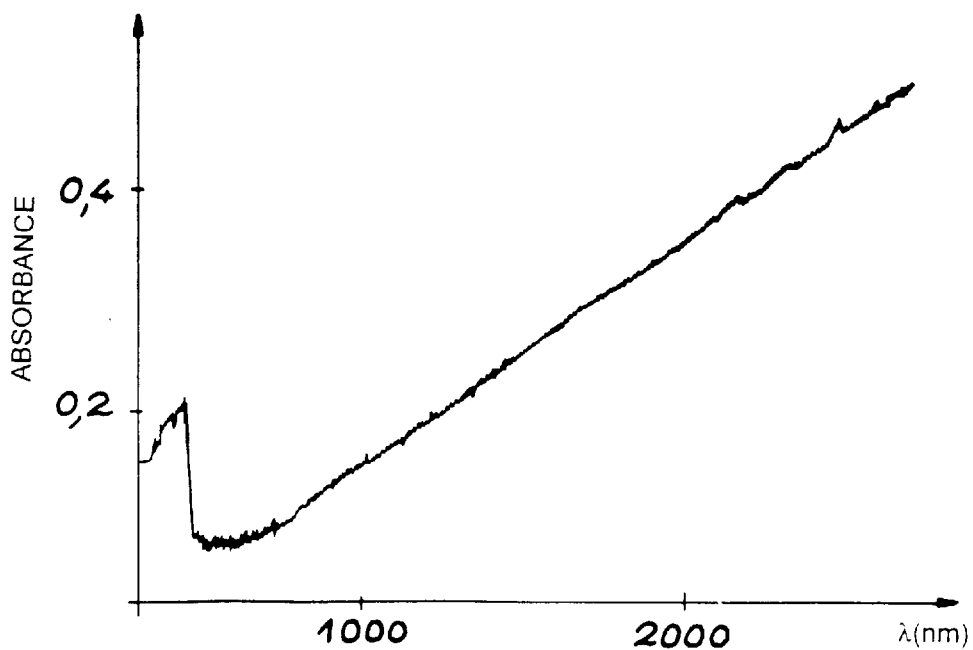
FIGS. 5 and 6 are UV, vis., near IR absorption spectra of a polyaniline obtained at −30° C.

FIG. 5 illustrates the spectrum obtained on a sample synthesised at a temperature of –30° C.

Figure 6:
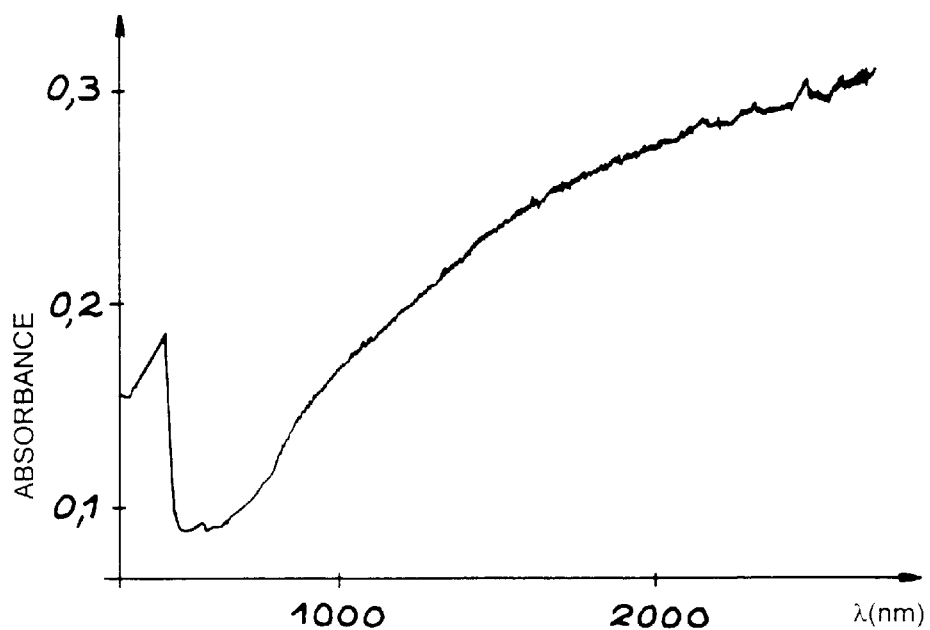

FIG. 6 illustrates the spectrum from a sample synthesised at a indicative temperature of –7° C.

The spectrum of emeraldine synthesised at –30° C. (FIG. 5) shows a more rounded polaronic peak at 440 nm and a very intense and very wide absorption band with its maximum far in the near IR, unlike the spectrum of emeraldine synthesised at –7° C. (FIG. 6) which shows a sharper peak at 444 nm and a more concave absorption band in the near IR, indicating a closer absorption maximum. The sample of emeraldine synthesised at –30° C. is characterised by an inherent viscosity $•_{inh}$ of 2.0 dl/g, a wavelength of the excitonic peak $•_{ex}$ of 678 um, a ratio of the peak intensities of UV/vis. absorption $I_{ex}/I_{...*}$ of 1.05 and conductivity • of 270 S/cm.

The sample of emeraldine synthesised at –7° C. is characterised by an inherent viscosity $•_{inh}$ of 0.94 dl/g, a wavelength of the excitonic peak $•_{ex}$ of 662 nm, a ratio of UV/vis. absorption peak intensities $I_{ex}/I_{...*}$ of 0.94 and conductivity • of 100 S/cm.

Figure 7:
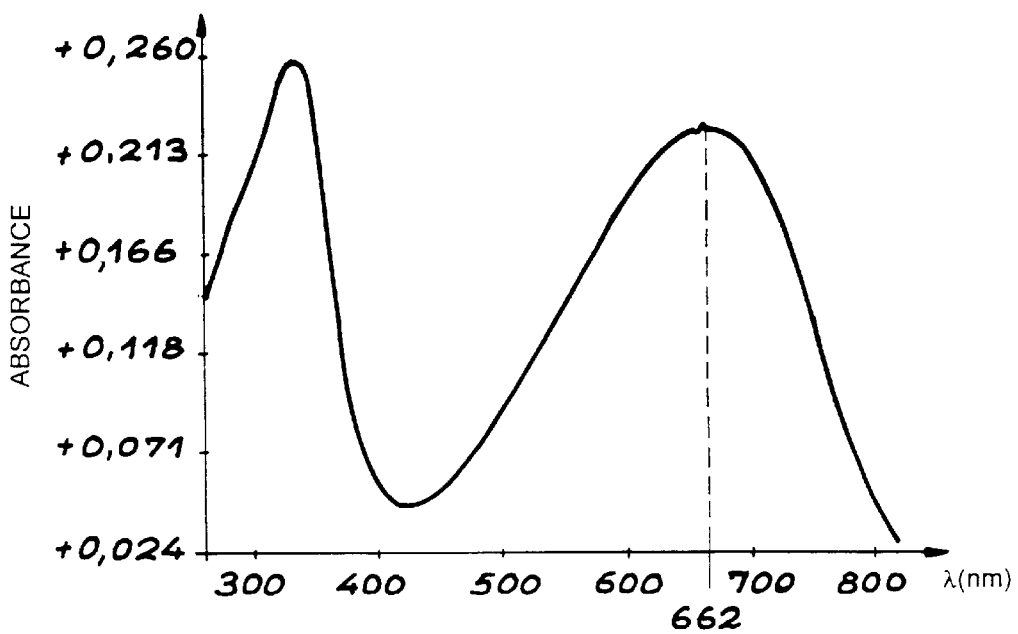
FIGS. 7 and 8 are UV near IR absorption spectra obtained with an emeraldine base synthesised at −70° C. which did not undergo the chloroform extraction step (FIG. 7), and which did undergo this step (FIG. 8) in NMP solution containing 0.5% LiCl.
Figure 8:
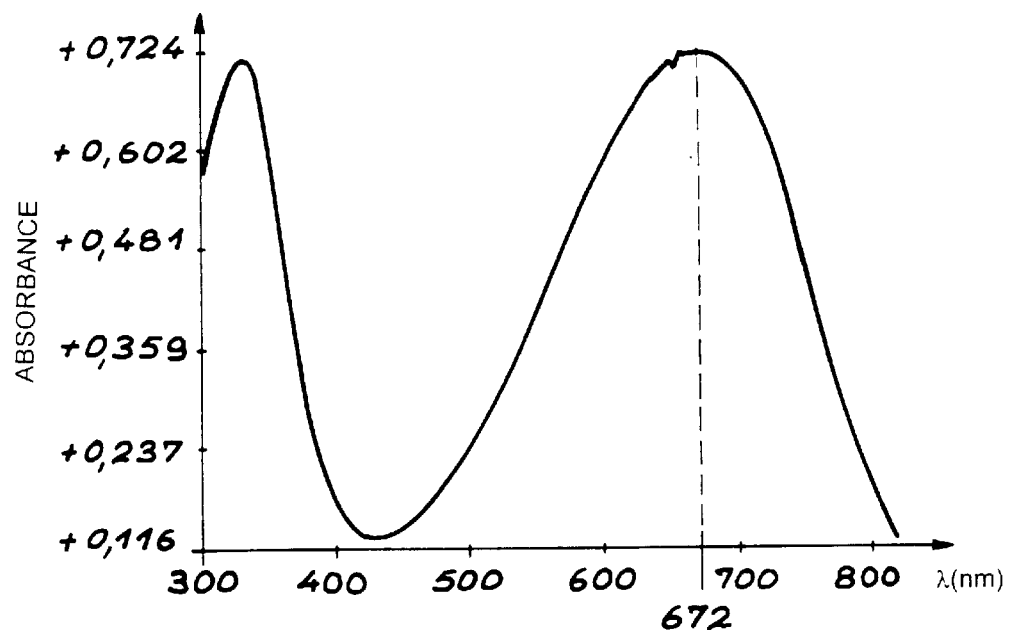

The beneficial effect of chloroform extraction on the properties of emeraldine base can be seen by comparing the UV, vis. absorption spectra in FIGS. 7 and 8.

FIG. 7 refers to emeraldine base synthesised at –7° C. before extraction and FIG. 8 illustrates the spectrum of this emeraldine base after extraction.

The emeraldine base which underwent extraction (FIG. 8) shows a more intense and red-shifted excitonic band: $•_{ex}$= 672 nm, with the ratio $I_{ex}/I_{...*}$=1.01, while the spectrum of crude synthesised emeraldine base (FIG. 7) indicates a wavelength $•_{ex}$ of 662 nm and a ratio of UV/vis. peak intensities $I_{ex}/I_{...*}$ of 0.87. This change is accompanied by a substantial increase in molecular mass and P.I.: $•_{inh}$=1.68 dl/g, $M_w$=50,000 g/mol and P.I.=2.3 before extraction, while $•_{inh}$=2.18 dl/g, $M_w$=145,000 g/mol and P.I.=3.3 after extraction.

Figure 9:
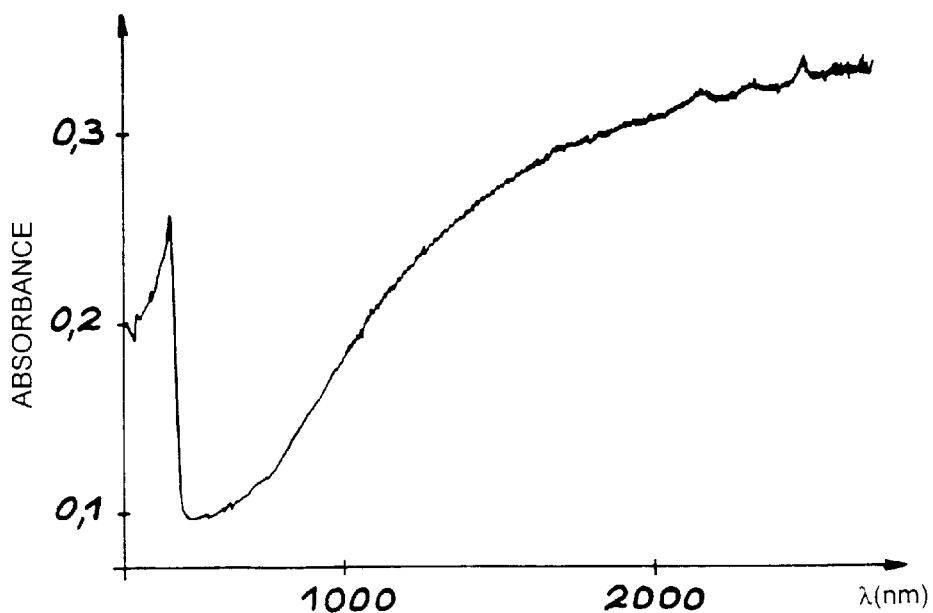
FIGS. 9 and 10 show absorption spectra of a polyaniline in the form of emeraldine synthesised at −7° C., protonated by CSA in metacresol, obtained with emeraldine base which did not undergo extraction (FIG. 9) and with emeraldine base which did undergo extraction (FIG. 10).
Figure 10:
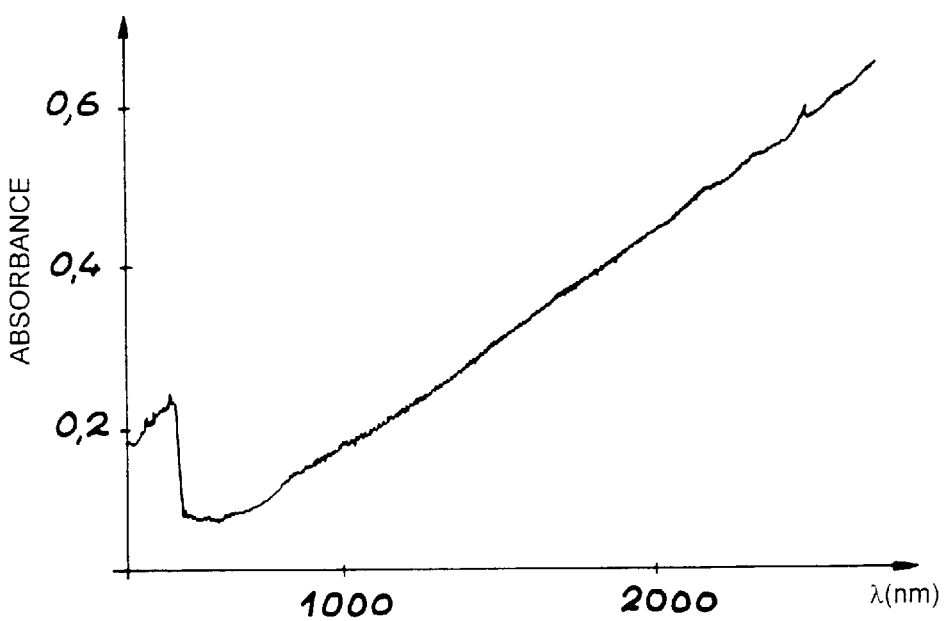

FIGS. 9 and 10 show V, vis., near IR absorption spectra of solutions of emeraldine protonated by CSA in meta-cresol made with the same emeraldine base before the extraction (FIG. 9) and after the extraction (FIG. 10).

The increase in the delocalisation of the charge bearers produced by extraction due to the increase in molecular mass can thus be seen. The conductivity of the film made from the emeraldine base which underwent extraction is 230 S/cm, while the conductivity of the film made from the crude emeraldine base is 100 S/cm.

The following examples illustrate the making of polyanilines by the invention process.

EXAMPLE 1

A solution of aniline chlorhydrate is made by dissolving 10 ml (0.1097 mol) of aniline in 85 ml of 3M HCl. 95 ml of ethanol is added to this solution and 16 g of LiCl is dissolved in it.

An oxidising solution is prepared by dissolving 6.25 g (0.0274 mol) of ammonium persulphate in 60 ml of 2M HCl and 8 g of LiCl is dissolved in it.

A $FeCl_2$ reducing solution is prepared by dissolving 3.64 g (0.0183 mol) of $FeCl_2$ and 5 g of LiCl in 50 ml of 2M HCl.

The aniline solution is put into a small 500 ml reactor with a double wall and with stirring and the solution is cooled to –25° C. by circulation of a thermostat-controlled refrigerating liquid allowing for cooling of the reactor. The APS solution is also cooled to –25° C. in another refrigerator.

A Pt electrode, a reference electrode of calomel and a temperature probe with resistance of 100 * are placed into the aniline solution by means of an electrolyte bridge containing an LiCl solution in ethanol. The electrodes and the probe are linked to a digital pHmeter-mVmeter controlled by a computer for recording of the redox potential of the solution and its temperature point by point.

When the two solutions arrive at a temperature of –25° C., the polymerisation begins when the ammonium persulphate solution is poured at all once into the reactor containing the aniline chlorhydrate solution and the redox potential of the solution and the temperature are then recorded every 15 seconds. The progress of the synthesis is monitored by checking the change in potential and temperature as a function of time.

The total volume of the solution is about ~265 ml, ~1M HCl, ~2.15 M LiCl, and ~36% ethanol by volume.

The reducing solution is put in the place of the oxidising solution to cool.

FIG. 1 illustrates the change in potential (curve 1) and temperature (curve 2) as a function of time.

With an indicator temperature of –25° C., as soon as the oxidant is added, an immediate increase in the redox potential of the aniline solution is observed from ~445 mV (the initial value) to 830 mV. After 3 minutes the redox potential decreases to reach a minimum of about 680 mV and then rises after 15 minutes to reach a plateau at 800–820 mV where it remains for 40 minutes. Then the potential begins to decrease.

When the ammonium persulphate solution is poured into the synthesis reactor containing the aniline solution, the temperature quickly comes to an equilibrium between the two solutions, because there is always a small difference in temperature between the two solutions. Then the temperature decreases by 2° C. for the first 20 minutes which corresponds to the beginning of the synthesis step during which the potential decreases and rises again. The temperature then rises as soon as the potential arrives at the plateau and continues to rise while the potential remains at the plateau and reaches a maximum when the potential begins to decrease after having passed the plateau.

At this precise moment, all of the ammonium persulphate is reduced and the synthesised polyaniline is in the form of pernigraniline in suspension in the solution, but the precipitation begins earlier, visibly beginning after about 20 minutes when the potential reaches the plateau.

To obtain polyaniline in the form of emeraldine, the $FeCl_2$ solution is added all at once. In order to better determine the moment to add the reducing agent, the temperature rise of the solution is also monitored to see when it arrives at its maximum.

The polymerisation reaction which produces the pernigraniline is highly exothermic because despite the cooling the temperature still rises by 3.5° C.

When the reducing solution is added the potential decreases sharply to 440 mV, indicating the total reduction of pernigraniline to emeraldine, and the temperature rises rapidly by 4° C. because this reaction is also exothermic. Then the temperature falls slowly to the indicator temperature of −25° C. over 40 minutes. The cooling and recording of potential and temperature are stopped and the solution is filtered. The solution can be left to heat to room temperature naturally and then filtered.

The solution is filtered on a funnel with a No. 4 glass filter plate. The precipitate is abundantly washed with a 1M HCl solution and it is dried in a vacuum oven at 40° C. for 12 hours. This yields crude synthesised emeraldine.

To obtain polyaniline in the form of emeraldine base, the crude emeraldine powder obtained is deprotonated by putting it in suspension with stirring in a 0.3M ammonium hydroxide solution for 48 hours. The solution is filtered as before, abundantly washed with water and the powder then dried in a vacuum at room temperature for 24 hours. This yields crude synthesised emeraldine base.

The crude emeraldine base then undergoes extraction with chloroform p.a. in a Soxhlet extractor for 8 hours to siphon colourless chloroform. The emeraldine base is then dried, first air-dried, then in a vacuum, at room temperature.

The deprotonation operation is then repeated with the ammonium hydroxide solution to yield emeraldine base in its final form.

The yield is 99% with respect to ammonium persulphate and 17% with respect to aniline. A solution of 0.1% emeraldine base is made in 97% sulphuric acid by taking 36.8 mg of emeraldine base in 20 ml of acid with magnetic stirring for 14 hours. The solution is filtered on a No. 4 glass filter and the inherent viscosity of the solution at 25° C. is measured using a Ubbelohde viscosimeter with a 0.5 mm capillary. This gives a viscosity of $•_{inh}$=1.97 dl/g.

Elementary analysis of Cl indicates a Cl content of 0.5%.

A 0.067% emeraldine base solution is prepared in NMP containing 0.5% LiCl by dissolving 1 mg of emeraldine base in 1.5 ml of NMP over 3 hours with stirring. The UV vis absorption spectrum between 330 and 820 nm is measured on a Hewlett Packard 8451A diode bar spectrophotometer using a suprasil quartz tank with an optical path length of 1 mm. This gives $•_{ex}$=674 nm, $•_{\_\_*}$=330 nm and $I_{ex}/I_{\_\_*}$=0.98.

A 0.5% solution of emeraldine base protonated by CSA is made by dissolving 0.1 g of emeraldine base and 0.13 g of CSA in 19.18 ml of meta-cresol with stirring at 50° C. for 48 hours and then at room temperature for at least 3 weeks. Evaporation of the meta-cresol in air at 50° C. for three days yields a 25 •m-thick film on a polypropylene substrate. It is detached from the substrate by immersion in a 1M CSA solution for 1 hour. The conductivity of the film is measured by the van der Pauw method after it has been rinsed with acetonitrile and dried. Conductivity •=320 S/cm is observed.

A drop of the solution is taken and spread by capillary adhesion between two plates of infrasil quartz. The UW vis. near IR absorption spectrum between 300 and 2700 nm is recorded using a Varian Carry 2400 spectrophotometer. There is a polaronic peak at 444 nm and a wide and intense absorption band in the near IR having its maximum far in the IR beyond the spectral range of the unit.

Crystallographic analysis of the diffraction spectrum X of the film recorded in transmission indicates a crystallisation rate of ~25%.

EXAMPLE 2

Figure 11:
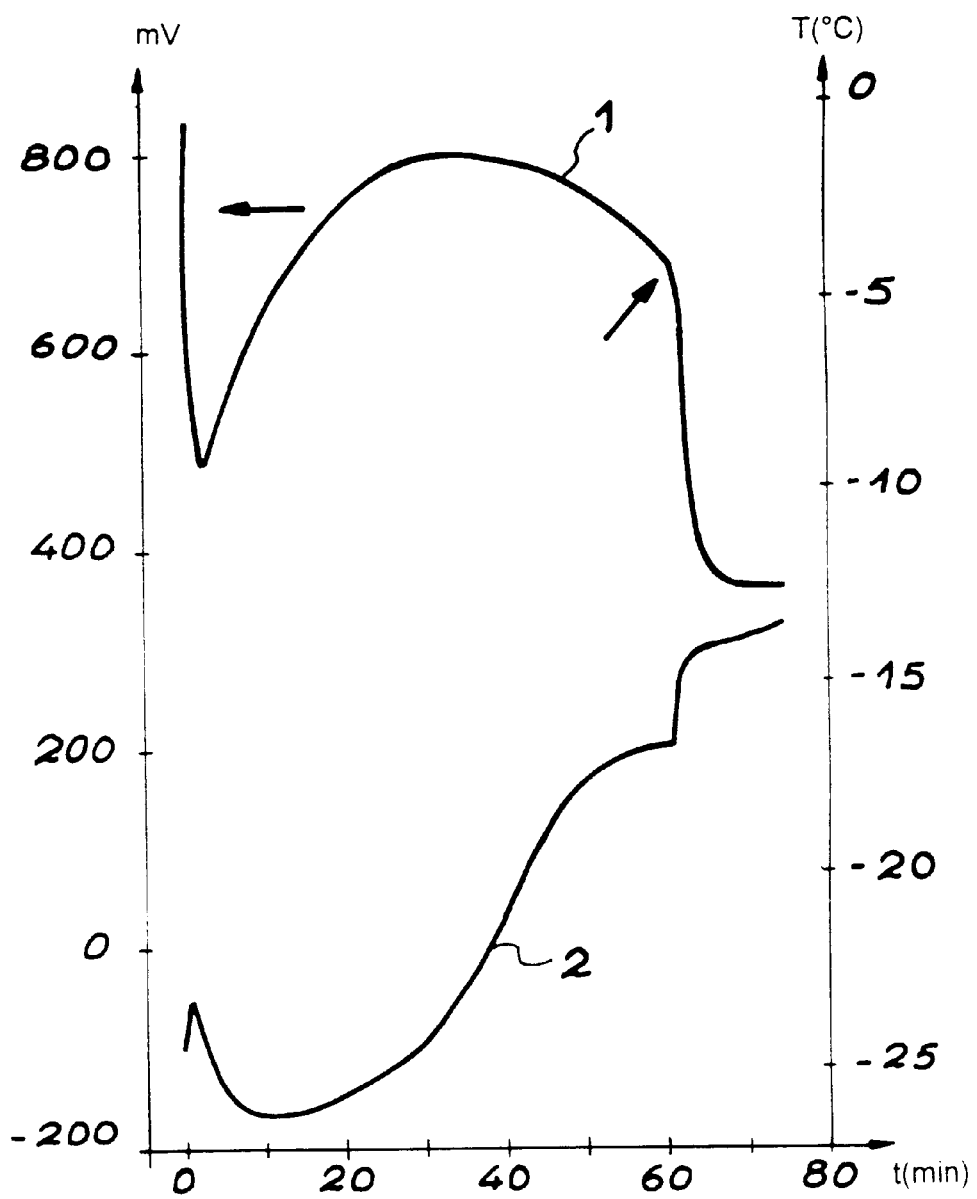
FIG. 11 is a graph which illustrates the change in potential (curve 1) and the change in temperature (curve 2) of the reaction medium in the case of example 2.

The same approach as in example 1 is used except that a simple reactor is used and placed in a Dewar flask containing o-oxylene crystals with a melting point of −25° C. The change in redox potential and temperature during this synthesis is presented in FIG. 11. The change in potential (curve 1) is similar to that shown in FIG. 1 corresponding to example 1, the change in temperature (curve 2) is also similar up to the point where the reducing solution is added. At the time of the reduction, the temperature rises sharply due to the rapid release of heat from the reduction and then it rises normally by natural heating up to room temperature.

The results of the measurements show no significant differences with respect to the results shown in example 1, indicating that the temperature at which the reduction is done has no influence on the polymer properties.

EXAMPLE 3

Done in the same manner as for example 1, except that the indicator temperature is set at −30° C.

The change in redox potential and temperature during the synthesis is similar to that shown in example 1. The yields are the same. The only significant difference is the time of polymerisation, in this case 110 minutes.

The characteristics of the polyaniline obtained are:

Cl content of 0.5%, inherent viscosity of 2.1 dl/g, wavelength of the excitonic absorption peak of emeraldine base $•_{ex}$=678.

wavelength of the fundamental peak of emeraldine base $•_{\_\_*}$=332 nm, and a ratio of the intensities of these peaks of $I_{ex}/I_{\_\_*}$=1.06

The UV, vis., near IR absorption spectrum of emeraldine does not show any significant differences with respect to that of the emeraldine synthesised in example 1 at −25° C. The conductivity of the film obtained is 330 S/cm.

What is claimed is:

1. Process for making a high molecular mass polyaniline in the form of emeraldine, which includes the following steps:
   (a) Polymerizing aniline or an aniline derivative to make pernigraniline by doing the polymerization in a homogeneous aqueous solution including the aniline or the aniline derivative, a protonic acid, a salt, an oxidizing agent and ethanol to yield pernigraniline, and
   (b) Reducing the pernigraniline obtained in step (a) to emeraldine by means of an aqueous reducing solution which does not contain aniline.

2. Process according to claim 1, in which the reducing solution is an aqueous solution of ferrous chloride including the protonic acid and salt used in step (a).

3. Process according to claim 2, in which the reducing solution is a solution of $FeCl_2$ with a concentration between 2.5 and 3M containing LiCl in a concentration between 2 and 2.5 M in HCl in a concentration of 1.5 to 2.5 M, containing twice the quantity needed to reduce the polyaniline to emeraldine.

4. Process according to claim 1, in which the reducing solution is an aqueous solution of copper chloride (CuCl) or tin chloride ($SnCl_2$) including the protonic acid and salt used in step (a).

5. Process according to claim 1, in which the protonic acid is hydrochloric acid, the salt is lithium chloride, and the oxidizing agent is ammonium persulfate.

6. Process according to claim 1, in which step (a) is done by adding an aqueous solution of aniline or an aniline derivative containing the protonic acid, salt and ethanol, a solution of the oxidizing agent and the salt in the protonic acid.

7. Process according to claim 5, in which the polymerization solution includes:
   0.25 to 0.5 mol/l of aniline or aniline derivative,
   0.5 to 2 mol/l of hydrochloric acid,
   2 to 3 mol/l of lithium chloride,
   30 to 40% ethanol by volume and
   a quantity of ammonium persulfate such that the molar ratio of ammonium persulfate to aniline or the aniline derivative APS/An is from 0.2 to 1.5%.

8. Process according to claim 6, in which the polymerization solution includes:
   0.25 to 0.5 mol/l of aniline or aniline derivative,
   0.5 to 2 mol/l of hydrochloric acid,
   2 to 3 mol/l of lithium chloride,
   30 to 40% ethanol by volume and
   a quantity of ammonium persulfate such that the molar ratio of ammonium persulfate to aniline or the aniline derivative APS/An is from 0.2 to 1.5%.

9. Process according to claim 1, in which step (a) is done at a temperature in the range from −45° C. to −5° C.

10. Process according to claim 5, in which the polymerization reaction of step (a) is monitored by determining the redox potential of the aqueous solution in which the polymerization is done in order to stop this polymerization reaction by addition of the reducing solution when the redox potential starts to decrease after having reached a maximum value.

11. Process according to claim 6, in which the polymerization reaction of step (a) is monitored by determining the redox potential of the aqueous solution in which the polymerization is done in order to stop this polymerization reaction by addition of the reducing solution when the redox potential starts to decrease after having reached a maximum value.

12. Process according to claim 9, in which the polymerization reaction of step (a) is monitored by determining the redox potential of the aqueous solution in which the polymerization is done in order to stop this polymerization reaction by addition of the reducing solution when the redox potential starts to decrease after having reached a maximum value.

13. Process according to claim 1, including in addition a step (c) involving the emeraldine separated from the reaction medium of step (b) undergoing an extraction and post-polymerization treatment with chloroform.

14. Process according to claim 13, in which the emeraldine treated with chloroform also undergoes deprotonation.

15. Process according to claim 13, in which the emeraldine separated from the reaction medium of step (b) undergoes deprotonation before step (c).

16. Process according to claim 14, in which the deprotonation is done with a 0.1 to 0.3M aqueous solution of ammonium hydroxide over 48 to 72 hours at room temperature.

17. Process according to claim 15, in which the deprotonation is done with a 0.1 to 0.3M aqueous solution of ammonium hydroxide over 48 to 72 hours at room temperature.

18. Process according to claim 14, in which the deprotonated emeraldine undergoes reprotonation with (±)-10-camphor sulfonic acid for a protonation rate of 0.5 $H^+$ per nitrogen atom.

19. Polyaniline in the form of emeraldine base obtained by the process according to any of claims 10 to 13, with an inherent viscosity of 1.8 to 2.2 dl/g (at 25° C., in 0.1% solution in concentrated sulfuric acid) and which is totally soluble in meta-cresol or in hexafluoroisopropanol after protonation by (±)-10-camphor sulphonic acid.

* * * * *